United States Patent
Werni et al.

(10) Patent No.: US 8,596,044 B2
(45) Date of Patent: Dec. 3, 2013

(54) EXHAUST GAS-TREATING DEVICE

(75) Inventors: Marcus Werni, Waiblingen (DE);
Rainer Lehnen, Eberspach (DE);
Gert-Ove Wahlström, Askim (SE)

(73) Assignees: Eberspächer Exhaust Technology GmbH & Co. KG, Neunkirchen (DE); Volvo Lastvagnar AB, Göteborg (SE)

( * ) Notice: Subject to any disclaimer, the term of this patent is extended or adjusted under 35 U.S.C. 154(b) by 681 days.

(21) Appl. No.: 12/731,461

(22) Filed: Mar. 25, 2010

(65) Prior Publication Data

US 2010/0242451 A1    Sep. 30, 2010

(30) Foreign Application Priority Data

Mar. 26, 2009  (DE) .......................... 10 2009 014 433

(51) Int. Cl.
*F01N 3/00* (2006.01)
(52) U.S. Cl.
USPC ................... 60/286; 60/297; 60/299; 60/303; 60/324
(58) Field of Classification Search
USPC .................................................... 60/286, 297
See application file for complete search history.

(56) References Cited

U.S. PATENT DOCUMENTS

| | | | |
|---|---|---|---|
| 6,393,835 B1 | 5/2002 | Stoll et al. | |
| 6,444,177 B1 * | 9/2002 | Muller et al. | 422/177 |
| 6,620,391 B2 * | 9/2003 | Muller et al. | 423/210 |
| 7,430,855 B2 | 10/2008 | Amemiya et al. | |
| 2006/0008397 A1 | 1/2006 | Bruck | |
| 2006/0156712 A1 * | 7/2006 | Buhmann et al. | 60/297 |
| 2006/0266022 A1 | 11/2006 | Woerner et al. | |
| 2007/0289294 A1 | 12/2007 | Werni et al. | |
| 2008/0314033 A1 | 12/2008 | Aneja et al. | |

FOREIGN PATENT DOCUMENTS

| | | |
|---|---|---|
| DE | 198 34 822 A1 | 2/2000 |
| DE | 102004043931 A1 | 3/2006 |
| DE | 102005002289 A1 | 7/2006 |
| DE | 102005025045 A1 | 12/2006 |
| DE | 102006023854 A1 | 11/2007 |
| EP | 1 691 045 A1 | 8/2006 |
| EP | 1 736 645 A1 | 12/2006 |
| WO | WO 2004/063540 A1 | 7/2004 |

* cited by examiner

*Primary Examiner* — Thomas Denion
*Assistant Examiner* — Jason Shanske
(74) *Attorney, Agent, or Firm* — McGlew and Tuttle, P.C.

(57) ABSTRACT

An exhaust gas-treating device (1) for an exhaust system of an internal combustion engine, especially of a motor vehicle, is provided with a housing (2), which has a jacket (3) extending circumferentially on the side and at least one bottom (4). The homogenization of the exhaust gas flow is improved with a mixing housing (14), which is arranged in the interior space (23) of the housing (2) and which has a mixing chamber (15). An inlet (16) of the mixing housing passes through the bottom (4) and communicates with the mixing chamber (15). An outlet (17) of the mixing housing passes through the bottom (4) and communicates with the mixing chamber (15).

20 Claims, 13 Drawing Sheets

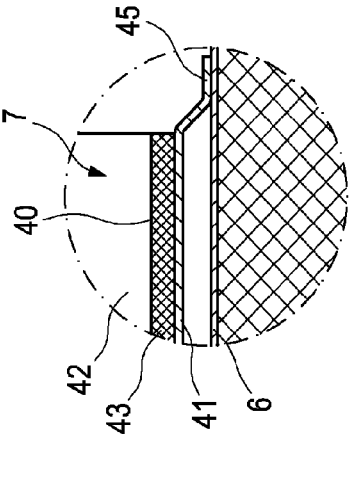
Fig. 8
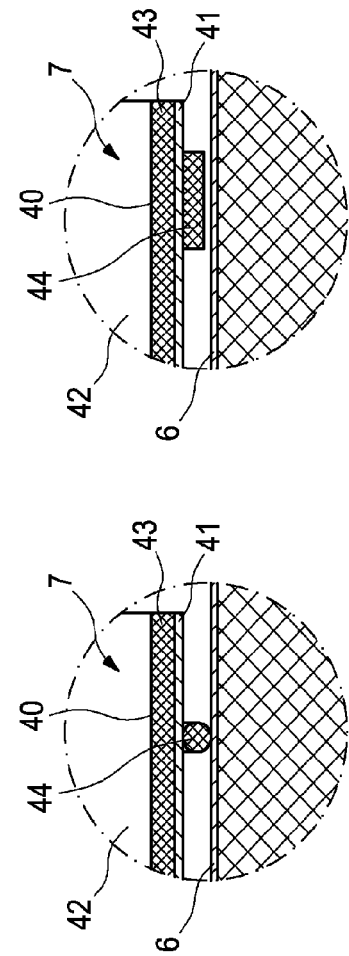
Fig. 9
Fig. 10
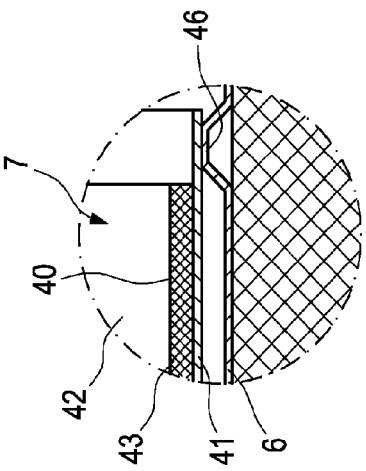
Fig. 11
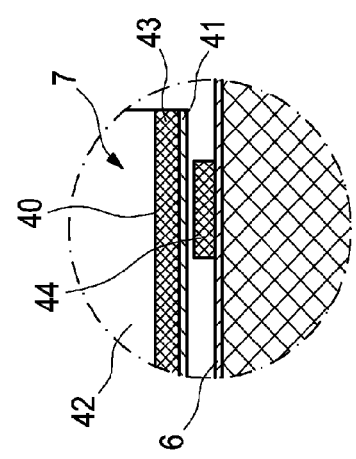
Fig. 12
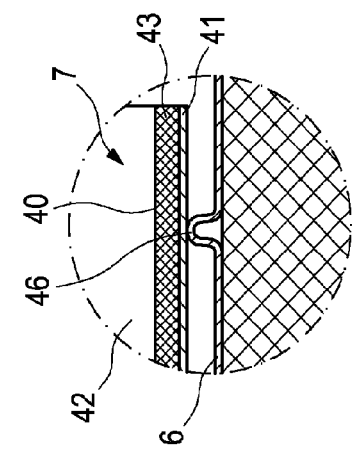
Fig. 13

US 8,596,044 B2

EXHAUST GAS-TREATING DEVICE

CROSS REFERENCE TO RELATED APPLICATIONS

This application claims the benefit of priority under 35 U.S.C. §119 of German Patent Application DE 10 2009 014 433.1 filed Mar. 26, 2009, the entire contents of which are incorporated herein by reference.

FIELD OF THE INVENTION

The present invention pertains to an exhaust gas-treating device for an exhaust system of an internal combustion engine, especially of a motor vehicle.

BACKGROUND OF THE INVENTION

It is known that liquid reducing agents are introduced into the exhaust gas flow for treating the exhaust gas. For example, ammonia or urea or an aqueous urea solution can be dosed to the exhaust gas flow upstream of a so-called catalytic converter, which can perform a selective catalytic reduction, in order to decompose nitrogen oxides in the SCR catalytic converter. It is important for the proper and efficient mode of operation of such an SCR catalytic converter or of another means operating with a dosed liquid educt that the most homogeneous mixture of exhaust gas and reducing agent be obtained. Furthermore, possibly extensive or complete evaporation of the educt introduced in the liquid state must be achieved, in addition, in case of certain educts before the mixture enters the means in question, for example, the SCR catalytic converter. It is common practice for this to provide within the respective exhaust gas-treating device a mixing section, which is usually formed by a straight tube, through which the educt-exhaust gas mixture enters a chamber, into which an inlet of the SCR catalytic converter in question or of the treating means in question opens.

SUMMARY OF THE INVENTION

The object of the present invention is to provide for an exhaust gas-treating device of the type mentioned in the introduction an improved embodiment, which is characterized especially by improved mixing or homogenization of the educt-exhaust gas mixture and/or by improved evaporation of an educt introduced in the liquid state into the exhaust gas.

The present invention is based on the general idea of additionally arranging in the housing of the exhaust gas-treating device a mixing housing, which contains a mixing chamber and has an inlet and an outlet, which communicate each with the mixing chamber. The inlet and outlet are arranged here such that they pass through a bottom of the housing each. In case of a flat bottom of the housing this inherently means that an exhaust gas flow, which enters the mixing chamber via the inlet and leaves same via the outlet, must be deflected by at least 180°. This substantial deflection of the gas flow leads to intensive mixing or homogenization. The separate mixing housing additionally has the major advantage that it can be manufactured separately from the housing of the exhaust gas-treating device proper and, for example, its tightness and/or its selected material can be adapted to the mixture to be mixed. For example, the mixing housing can be manufactured from a material of higher quality while the housing of the exhaust gas-treating device can be manufactured from a material that is less expensive compared thereto or needs to be sealed less carefully. On the whole, the manufacturing costs can be significantly reduced hereby and sufficient flow mixing can be achieved at the same time.

Corresponding to an especially advantageous embodiment, at least one guide wall, which forms a mixing section leading from the inlet via a deflecting section to the outlet in the mixing chamber, may be arranged in the mixing housing in an especially advantageous embodiment. A comparatively long mixing section can be embodied within the mixing chamber due to this specific flow guiding. The longer this mixing section, the longer is the residence time of the mixture within the mixing chamber, which is advantageous for the intensive homogenization as well as for an intensive evaporation of an educt introduced in the liquid state.

An intermediate wall, which separates two planes in the mixing chamber, in which planes the mixing section extends, may be arranged in the mixing housing in a variant. The length of the mixing section can be significantly increased hereby. In particular, the length of the mixing section can be quasi doubled hereby.

It is obvious that the above-mentioned features, which will also be explained below, can be used not only in the particular combination indicated, but in other combinations or alone as well without going beyond the scope of the present invention.

Preferred embodiments of the present invention are shown in the drawings and will be explained in more detail below, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 8 is an enlarged view of a detail VIII from FIG. 3, showing an embodiment for providing axial displaceability;

FIG. 9 is an enlarged view of a detail VIII from FIG. 3, showing another embodiment for providing axial displaceability;

FIG. 10 is an enlarged view of a detail VIII from FIG. 3, showing another embodiment for providing axial displaceability;

FIG. 11 is an enlarged view of a detail VIII from FIG. 3, showing another embodiment for providing axial displaceability;

FIG. 12 is an enlarged view of a detail VIII from FIG. 3, showing another embodiment for providing axial displaceability;

FIG. 13 is an enlarged view of a detail VIII from FIG. 3, showing another embodiment for providing axial displaceability;

DESCRIPTION OF THE PREFERRED EMBODIMENTS

Figure 1:
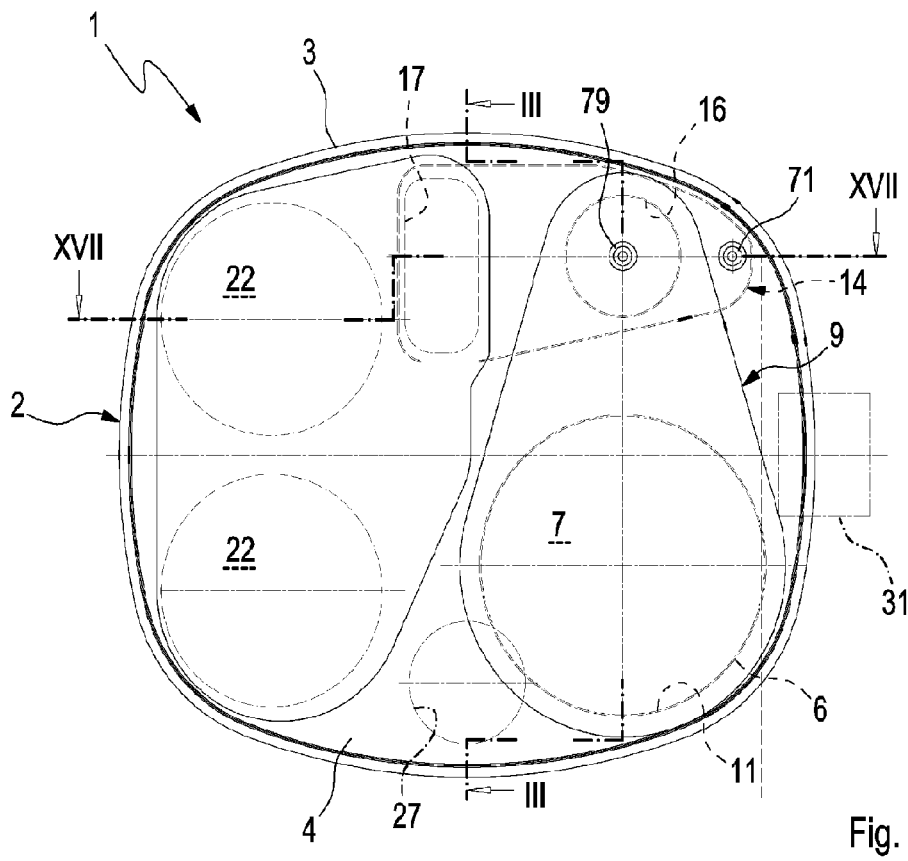
FIG. 1 is an axial view of an exhaust gas-treating device with deflecting housing.

Referring to the drawings in particular, corresponding to FIG. 1, an exhaust gas-treating device 1, which is intended for use in an exhaust system of an internal combustion engine, especially of a motor vehicle, may have a housing, which has a jacket 3 extending laterally circumferentially, as well as two end-side bottoms or end bottoms 4, 5, of which only one or the first end bottom 4 faces the viewer in FIG. 1. The other or second end bottom is arranged at the end of the housing 2 located away from the first end bottom 4.

Figure 2:
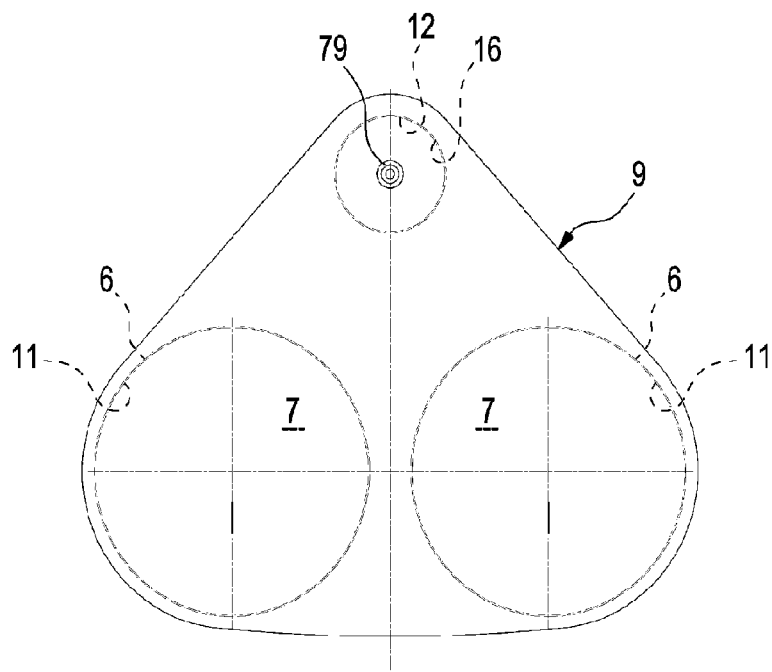
FIG. 2 is an axial view of a deflecting housing of another embodiment.
Figure 3:
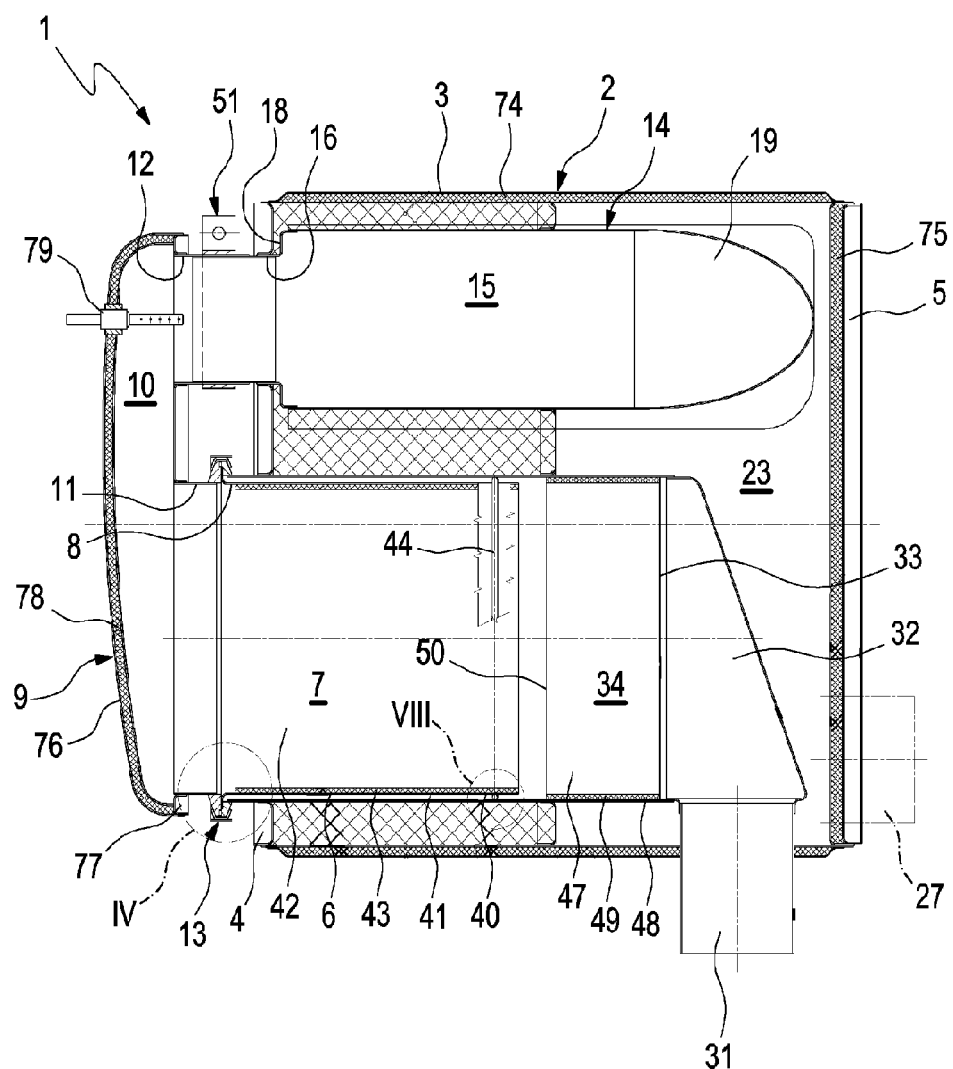
FIG. 3 is a longitudinal section of the exhaust gas-treating device corresponding to the section lines III in FIG. 1.

Corresponding to FIGS. 1-3, the exhaust gas-treating device 1 is preferably equipped with at least one mounting tube 6. Precisely one such mounting tube 6 is provided in the embodiment shown in FIGS. 1 and 3. FIG. 2 shows, purely as an example, an embodiment with two such mounting tubes 6. The respective mounting tube 6 passes axially through the first end bottom 4. Furthermore, the respective mounting tube 6 accommodates a particle filter 7. The respective particle filter 7 is plugged for this into an outlet end 8 of the mounting tube 6, which said outlet end 8 passes through the first end bottom 4, axially and from the outside, i.e., from a side facing away from the interior space 23 of housing 2. Particle filter 7 is arranged now coaxially with the mounting tube 6.

In addition, a deflecting housing 9 is provided in the example. This contains, corresponding to FIG. 3, a deflecting chamber 10. Furthermore, the deflecting housing 9 has at least one inlet 11 communicating with the deflecting chamber 10 as well as at least one outlet 12 communicating with the deflecting chamber 10. The deflecting housing 9 is attached to the housing 2 of the exhaust gas-treating device 1, which can hereinafter also be called main housing 2. At least one fastening means 13, which makes possible the detachable fastening of the respective inlet 11 of the deflecting housing 9 to the respective outlet end 8 of the respective mounting tube 6, is used for this.

In addition or as an alternative, the exhaust gas-treating device 1 being shown here may also have, besides, a mixing housing 14, which is arranged in the main housing 2. Mixing housing 14 contains a mixing chamber 15 and has an inlet 16, which communicates with the mixing chamber 15, as well as an outlet 17, which likewise communicates with the mixing chamber 15. Both the inlet 16 and the outlet 17 pass through the first end bottom 4 of the main housing 2. The mixing chamber 14 is recognizable in the embodiments being shown here in the area of a front side 18 facing the first bottom 4 only in physical contact with the main housing 2, whereas it is otherwise located at a spaced location from the main housing 2, i.e., especially from jacket 3 and from the second end bottom 5. The dimensioning of the mixing housing 14 is preferably adapted to the dimensioning of the main housing 2 such that a deflection area 19 located away from the inlet 16 in the mixing chamber 15 is located farther away from the first end bottom 4 than from the second end bottom 5. In other words, the mixing housing 14 extends from the first end bottom 4 to the second end bottom 5, but preferably without touching this. As a result, mixing chamber 15 assumes a comparatively great length in the axial direction of the especially cylindrical or barrel-shaped main housing 2.

Outlet 17 of the mixing housing 14 opens into a deflecting chamber 20, which can hereinafter be called an additional deflecting chamber 20. Furthermore, at least one inlet 21 of at least one SCR catalytic converter 22 opens into this additional deflecting chamber 20. The respective inlet 21 of the SCR catalytic converter 22 likewise passes through the first end bottom 4. The respective SCR catalytic converter 22 extends otherwise in the interior 23 of the main housing 2. Corresponding to FIG. 1, the exhaust gas-treating device 1 has two such SCR catalytic converters 22 in this example. It is clear that there may also be more or fewer SCR catalytic converters 22. Gas flows through the two SCR catalytic converters 22 in parallel and they open on the outlet side, via a corresponding outlet 24 each, into the interior 23 or into a settling chamber 25 of the main housing 2, which said chamber is formed in the interior 23. Purely as an example, the SCR catalytic converter 22 has two SCR catalytic converters 26 in the example, which are arranged one after the other, i.e., gas can flow through them in series.

Main housing 2 has, in the usual manner, an outlet port 27, which communicates, for example, with the settling chamber 25. In addition, an intermediate bottom 28, which separates in the interior 23 the settling chamber 25 from an absorption chamber 29, which may be filled with a sound-absorbing material 30 in the example, may be arranged in the main housing 2. Intermediate bottom 28 is designed such that it is permeable to air-borne sound. For example, it has a corresponding perforation. In addition, additional sound-absorbing measures may be provided in the exhaust gas-treating device 1.

Main housing 2 is equipped, furthermore, with an inlet port 31, which is connected corresponding to FIG. 3 in the interior 23 via a deflecting shell 32 to an inlet 33 of an oxidation-type catalytic converter 34. The oxidation-type catalytic converter 34 is arranged upstream of the particle filter 7. If a plurality of particle filters 7 are accommodated in the main housing 2, correspondingly many oxidation-type catalytic converters 34 are provided as well, to which exhaust gas is admitted via a common inlet port 31 or via separate inlet ports 31. It is likewise possible to provide a common oxidation-type catalytic converter 34 for a plurality of particle filters 7.

A preferred embodiment and corresponding processes will be discussed in more detail below with respect to FIGS. 4-7. The particle filter 7 correspondingly has an outlet-side end section 35, which faces the deflecting housing 9 and is preferably configured such that it can be integrated into the fastening means 13. Said end section 35 is integrated in the fastening means 13 such that axial fixation of the particle filter 7 to the mounting tube 6 or to the inlet 11 of the deflecting housing 9 and hence also axial fixation of the particle filter 7 to the deflecting housing 9 is also formed hereby. By separating the fastening means 13, the axial fixation of the particle filter 7 is eliminated as well, so that the particle filter 7 can be pulled axially out of the mounting tube 6 when the deflecting housing 9 is removed. By mounting the deflecting housing 9 and by fastening the deflecting housing 9 to the main housing 2, the respective particle filter 7 is also fixed at the same time in the relative position intended therefor by means of the fastening means 13.

Figure 4:
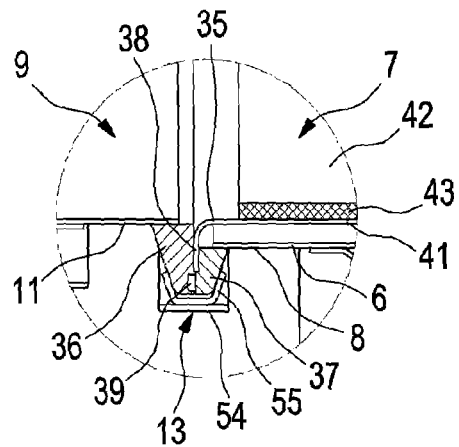
FIG. 4 is an enlarged view of a detail IV in FIG. 3, showing one clamp connection embodiment of the fastening means.
Figure 5:
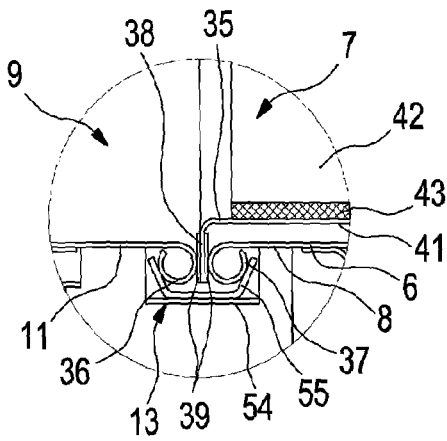
FIG. 5 is an enlarged view of a detail IV in FIG. 3, showing another clamp connection embodiment of the fastening means.
Figure 6:
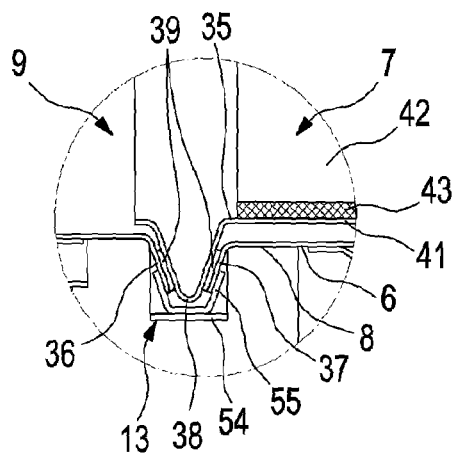
FIG. 6 is an enlarged view of a detail IV in FIG. 3, showing another clamp connection embodiment of the fastening means.
Figure 7:
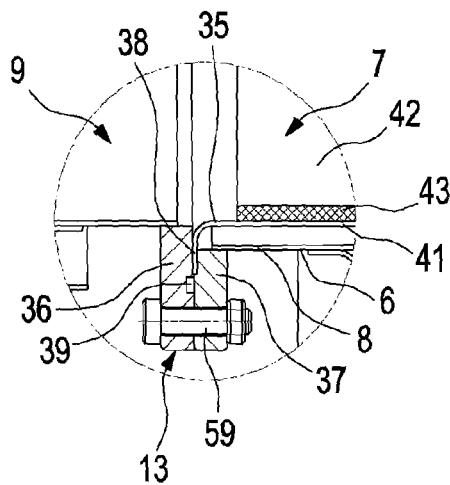
FIG. 7 is an enlarged view of a detail IV in FIG. 3, showing another embodiment of the fastening means.

The fastening means 13 is designed as a clamp connection in the embodiments according to FIGS. 4-6. Contrary to this, FIG. 7 shows a fastening means 13 designed as a screwed flange connection. Corresponding to FIGS. 4-7, the respective fastening means 13 comprises a first mounting flange 36, which is formed at the free end of the respective inlet 11. Furthermore, the fastening means 13 comprises a second mounting flange 37, which is formed at the free outlet end 8 of the respective mounting tube 6. The outlet-side end section 35 of the particle filter 7 has a collar 38, which projects outwardly and extends circumferentially in some segments or preferably in its entirety. In the mounted state shown, this collar 38 is arranged axially between the mounting flanges 36, 37 of the fastening means 13. The fastening means 13 is preferably configured now such that it makes it possible to axially brace the collar 38 between the mounting flanges 36, 37.

The respective fastening means 13 may be equipped with at least one seal 39 in order to improve the gas tightness of the connection made. Exactly one such seal 39, which is axially directly in contact with the two mounting flanges 36, 37, is provided in the example according to FIGS. 4 and 7. The collar 38 is directly in contact with the mounting flanges 36, 37 in these cases. Contrary to this, two such seals 39 are provided in the embodiments according to FIGS. 5 and 6, and the mounting flanges 36, 37 are supported at the collar 38 via one of these seals 39 on sides mutually facing away from one another. Especially advantageous is an embodiment in which the seals 39 are fastened to the collar 38, e.g., by bonding or vulcanization. The respective seal 39 can then also be replaced automatically by changing the particle filter 7. In addition, mounting becomes simpler.

To make it possible to replace the particle filter 7 in a simplified manner, it is preferably equipped with a jacket 41, which has a tubular design and which accommodates at least one particle filter element 42. The particle filter element 42 is enveloped here by means of a mounting mat 43 in the usual manner and is thus positioned in the jacket 41. The aforementioned collar 38 is preferably made integrally in one piece with this jacket 41 of the particle filter 7.

Corresponding to FIG. 3, an inlet-side end section 40 of the particle filter 7, which end section is located away from the deflecting housing 9, can be radially supported at the mounting tube 6 such that said end section 40 is axially displaceable relative to the mounting tube 6. This axial displaceability of the inlet-side end section 40 can be embodied in different ways. A plurality of alternative solutions are shown as examples in FIGS. 8-13. For example, an annular or ring segment-shaped bearing body 44, which can slide on the mounting tube 6, may be fastened to the particle filter 7 or to the jacket 41 thereof corresponding to FIG. 8.

Corresponding to FIGS. 9 and 12, the bearing body 44 may be made elastic and formed, for example, by a collar or pad or wiremesh or mounting mat material, which extents fully circumferentially or extends circumferentially in some segments. This elastic bearing body 44 may be fastened to the particle filter 7 or the jacket 41 thereof corresponding to FIG. 9 and slide on the mounting tube 6. It is likewise possible, corresponding to FIG. 12, to arrange such an elastic bearing body 44 at the mounting tube 6, so that the particle filter 7 or the jacket 41 thereof can slide thereon.

No separate bearing body 14 is used in the embodiments according to FIGS. 10, 11 and 13, but a contour that makes mounting possible is formed directly at the particle filter 7 or at the jacket 41 thereof corresponding to FIG. 10 or directly at the mounting tube 6 corresponding to FIGS. 11 and 13. For example, FIG. 10 shows a cross-section expansion 45, which is formed directly at jacket 41 of particle filter 7 and which may be configured such that it extends fully circumferentially or extends circumferentially in some segments. As can be recognized, this cross-section expansion 45 is supported directly at the mounting tube 6. Contrary to this, a cross-section contraction 46 formed at the mounting tube 6, which is dimensioned such that it comes into direct radial contact with the particle filter 7 or with the jacket 41 thereof, is provided in the embodiments according to FIGS. 11 and 13. This cross section contraction 46 may also extend fully circumferentially or extend circumferentially in some sections. For example, the linear support shown in FIG. 11 indicates a cross section contraction 46 extending in an annular pattern, while the flat support shown in FIG. 13 indicates a cross section contraction 46 extending circumferentially in a punctiform manner or in some segments, which has a plurality of contact areas arranged at spaced locations from one another in the circumferential direction.

FIG. 3 shows another peculiarity of the exhaust gas-treating device 1 shown here. The oxidation-type catalytic converter 34 comprises in the example an oxidation-type catalytic converter element 47, which is arranged in a tubular jacket 48 and is positioned in the corresponding jacket 48 by means of a corresponding mounting mat 49. Jacket 48 of the oxidation-type catalytic converter 34 is axially extended on an outlet side 50 of the oxidation-type catalytic converter 34. This axial outlet-side extension of jacket 48 of the oxidation-type catalytic converter 34 forms the mounting tube 6 in the embodiments being shown here. An extreme simplification and weight reduction is obtained hereby and simple possibility of replacing the particle filter 7 is achieved.

Corresponding to FIG. 3, the outlet 12 of the deflecting housing 9 and the inlet 16 of the mixing housing 14 are connected to one another in a communicating manner. A fastening means 51, which makes it possible to detachably fasten the outlet 12 and the inlet 16 to one another, shall be used for this connection as well. This additional fastening means 51 may be, in principle, of the same design as the aforementioned fastening means 13. Thus, this is preferably also a clamp connection or a screwed flange connection.

Figure 14:
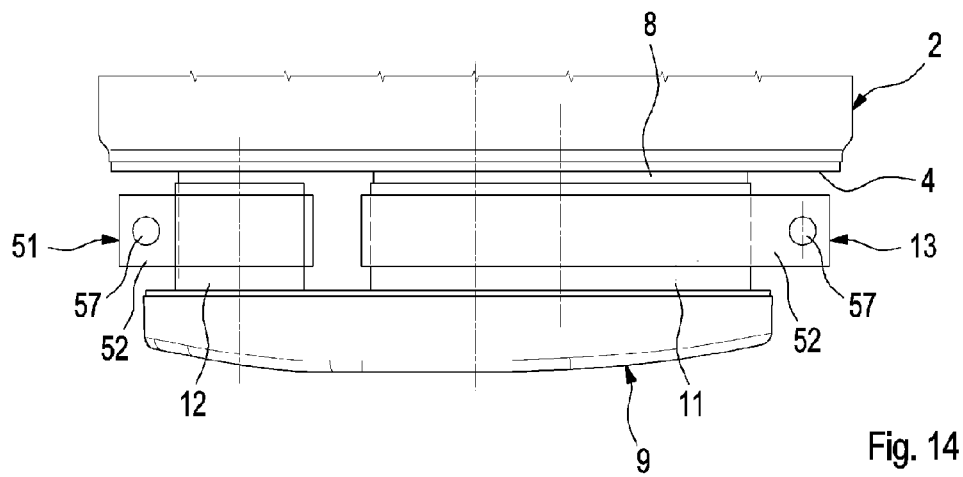
FIG. 14 is a side view of the exhaust gas-treating device in the area of the deflecting housing according to one embodiment.
Figure 15:
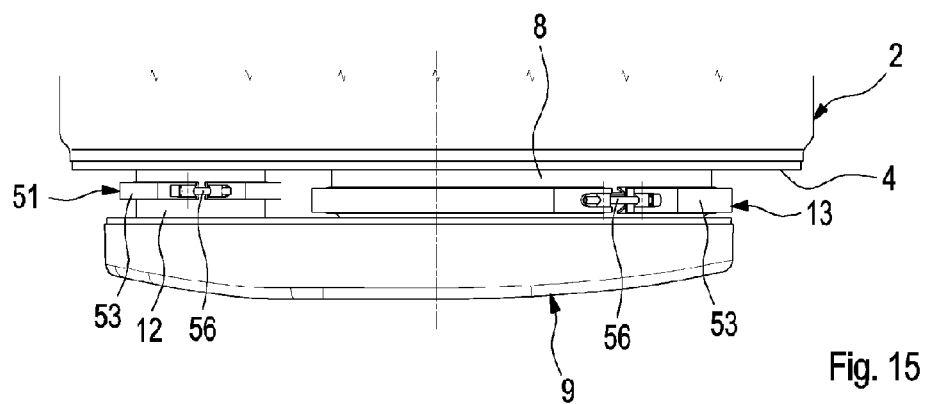
FIG. 15 is a side view of the exhaust gas-treating device in the area of the deflecting housing according to another embodiment.
Figure 16:
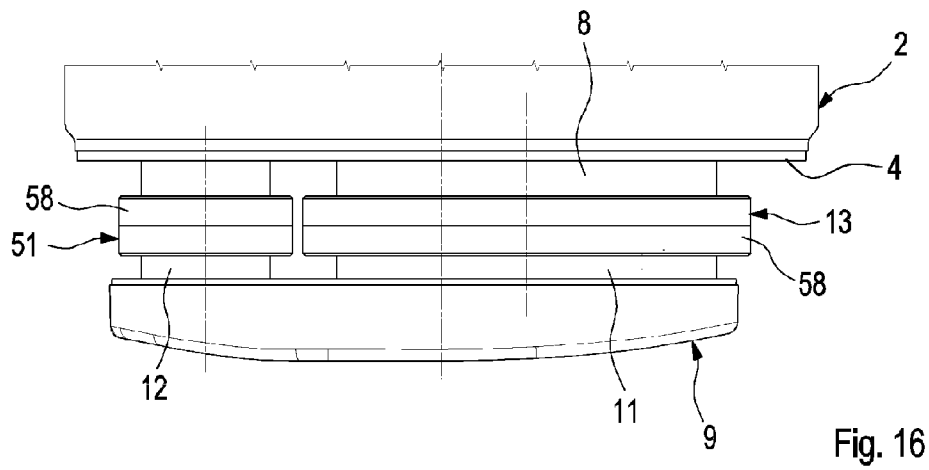
FIG. 16 is a side view of the exhaust gas-treating device in the area of the deflecting housing according to another embodiment.
Figure 17:
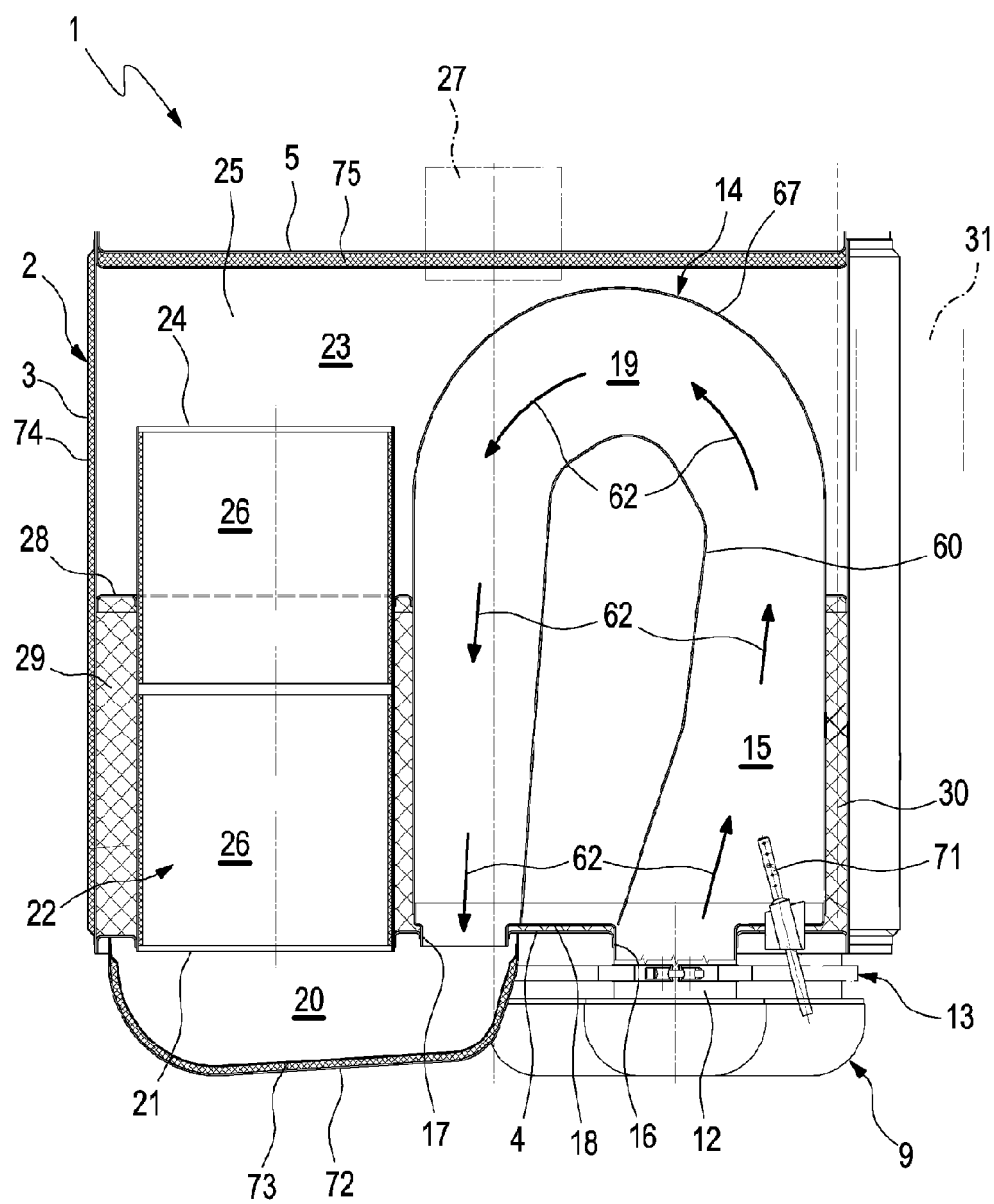
FIG. 17 is a longitudinal section of the exhaust gas-treating device corresponding to section lines XVII in FIG. 1.

FIGS. 14-16 show different embodiments. FIGS. 14 and 15 show a clamp connection each, wherein the respective clamp 52 is designed as a flat clamp 52, which brings about only radial pressing of the tube sections plugged coaxially into one another, namely, between the outlet 8 of the mounting tube 6 and the inlet 11 of the deflecting housing 9, on the one hand, and between the outlet 12 of the deflecting housing 9 and the inlet 16 of the mixing housing 14, on the other hand. An embodiment corresponding to FIG. 15, in which the respective clamp connection 13, 51 is designed as a V clamp 53, is preferred. Such a V clamp 53 can be equipped corresponding to FIGS. 4-6 with a circumferential tensioning band 54 as well as with a V-section 55, as a result of which axial pressing of the mounting flanges 36, 37 can be achieved by means of such a V clamp 53, which can also be called a V-band clamp. FIG. 15 indicates tightening means 56, which make it possible to tighten the respective clamp 53 in the usual manner. Contrary to this, FIG. 14 shows for the respective clamp 52 only an area 57, which is intended for arranging a suitable tightening means.

Finally, FIG. 16 shows an embodiment in which the respective fastening mans 13, 51 is designed as a screwed flange connection 58. Corresponding screws 59 can be recognized in FIG. 7. It can be determined from FIGS. 14-16 that the fastening means 13, 51 operating with V-clamps 53 have an especially compact design in the axial direction. FIG. 3 indicates that the two fastening means 13, 51 do not necessarily have to be of identical design. Thus, the fastening means 13 associated with the particle filter 7 is designed as a V-clamp 53, whereas the fastening means 51 associated with the mixing housing 14 is designed as a flat clamp 52 here as an example.

Corresponding to FIGS. 17-23 and partly corresponding to FIGS. 24-29, at least one guide wall 60 may be arranged in the mixing housing 14. The embodiments according to FIGS. 17 and 20-23 show only a single guide wall 60 each, whereas the embodiments according to FIGS. 18 and 19 additionally have another guide wall 61. The respective guide wall 60, 61 forms within the mixing chamber 15 a mixing section 62, which is indicated by arrows in FIGS. 17-23. However, simple embodiments which make do without a guide wall 60, 61 are conceivable as well.

Figure 24:
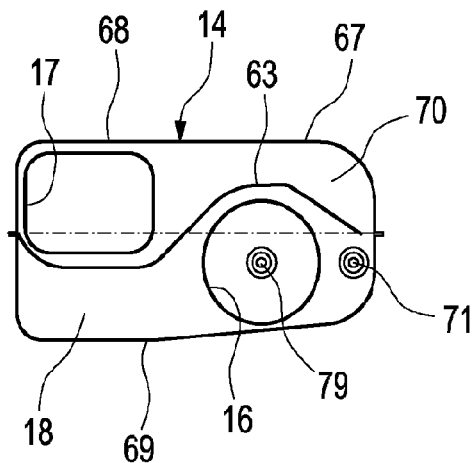
FIG. 24 is an axial view of the mixing housing corresponding to the embodiment according to FIG. 18.
Figure 18:
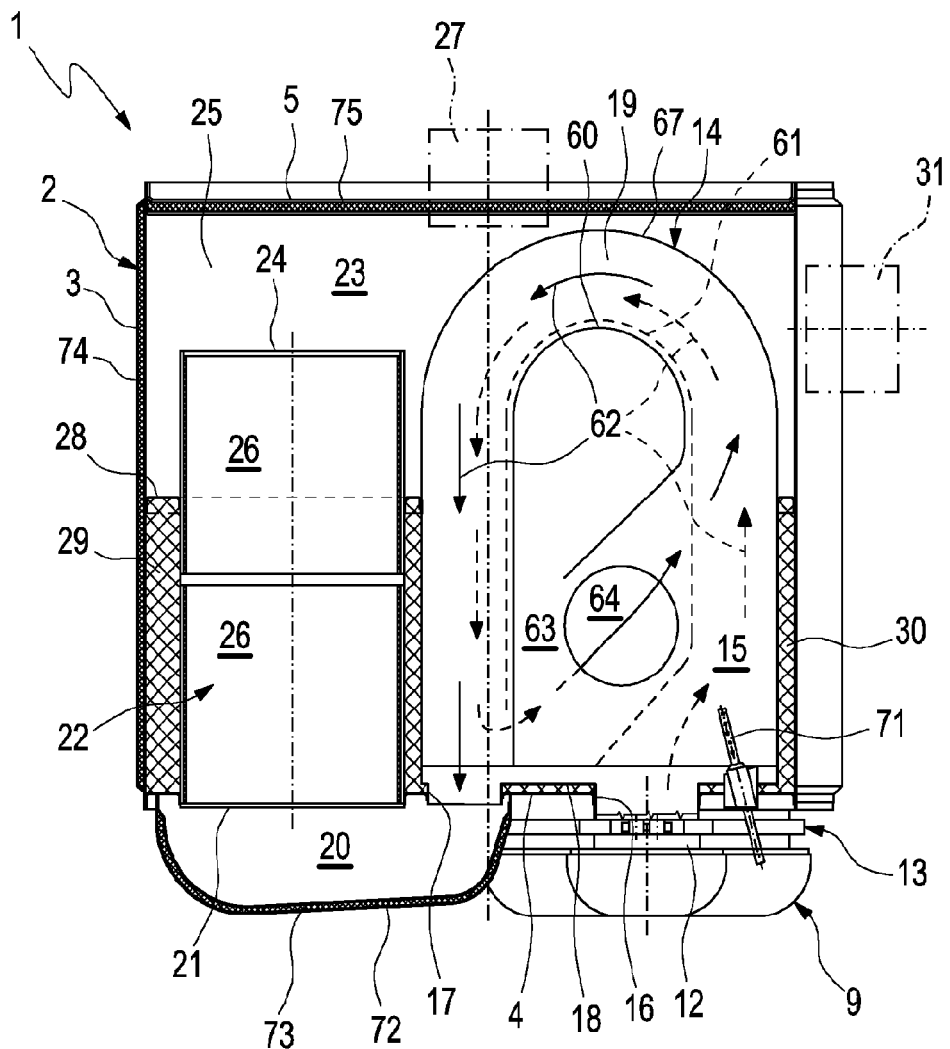
FIG. 18 is a sectional view as in FIG. 17, but showing a different embodiment of a mixing housing.
Figure 25:
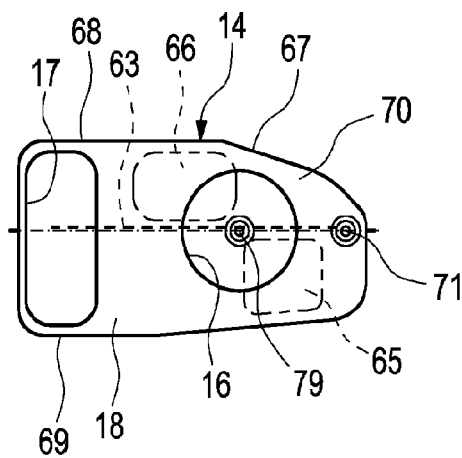
FIG. 25 is an axial view of the mixing housing corresponding to the embodiment according to FIG. 19.
Figure 19:
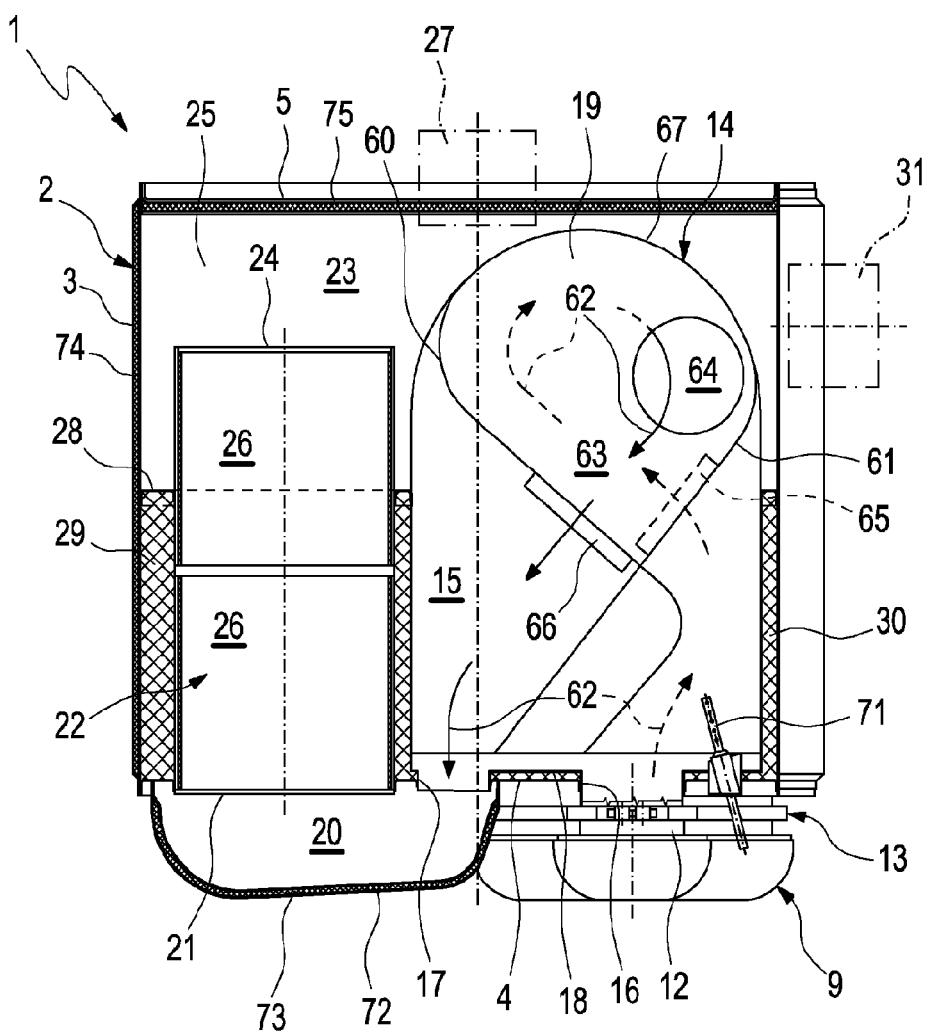
FIG. 19 is a sectional view as in FIG. 17, but showing another different embodiment of the mixing housing.
Figure 26:
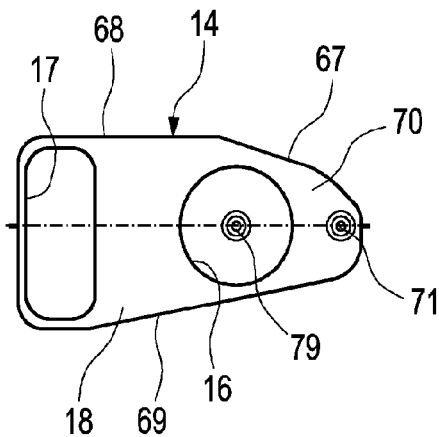
FIG. 26 is an axial view of the mixing housing corresponding to the embodiment according to FIG. 20.

In addition, an intermediate wall 63, which can be better recognized in the corresponding side views in FIGS. 24 and 25, respectively, is arranged in the mixing housing 14 in the embodiments according to FIGS. 18 and 19. The respective intermediate wall 63 separates two planes within the chamber 15. The mixing section 62 extends through both planes. A section of the mixing section 62, which extends in the plane facing away from the viewer, is indicated for illustration by arrows drawn in broken line, while a section of the mixing section 62, which is located in the plane facing the viewer, is indicated by arrows drawn in solid line. As can be recognized, comparatively complex mixing sections 62 can be embodied. In any case, the exhaust gas flow is passed through the mixing housing 14 such that at least one deflection of 180° becomes established between a flow direction at the inlet 16 and a flow direction at the outlet 17. Even a flow deflection by more than 180° is readily achieved in the embodiments according to FIGS. 18 and 19. The exhaust gas flow is deflected by 180° three times i.e., by a total of about 540°, in the embodiment according to FIG. 18. Flow deflection by at least 360° or at least 450° is achieved in the embodiment according to FIG. 19.

Figure 20:
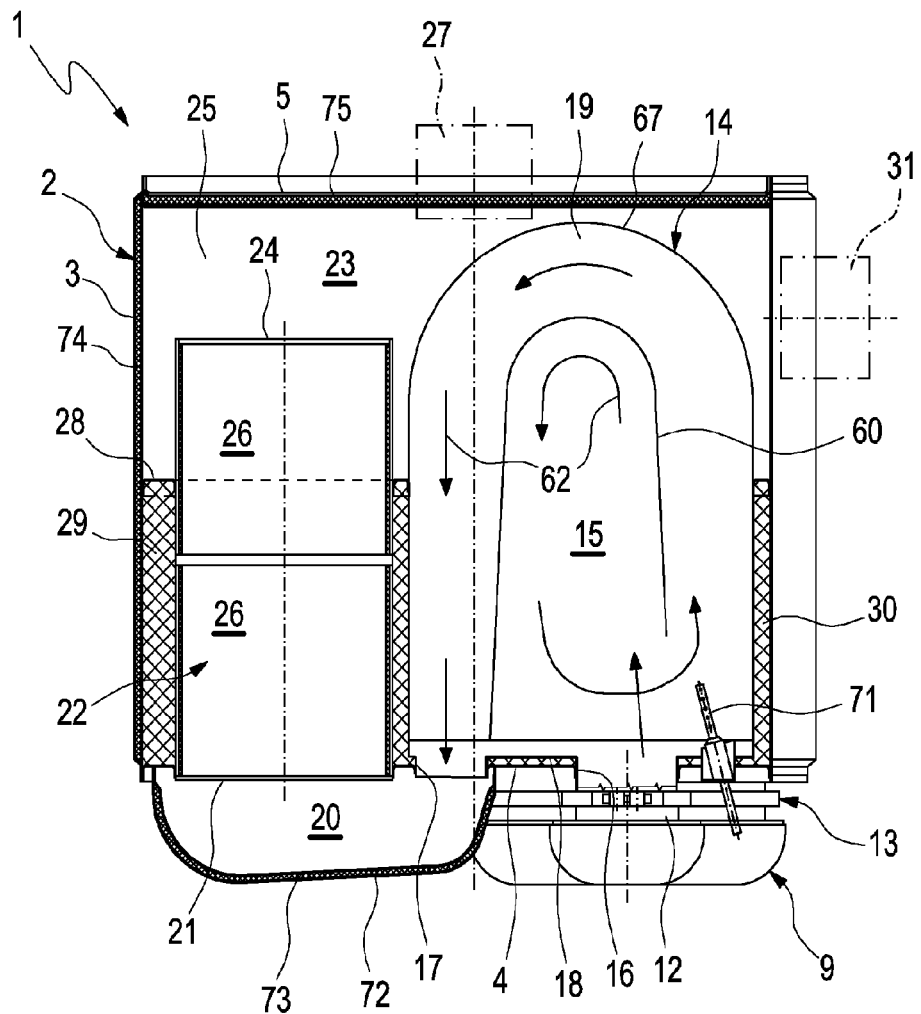
FIG. 20 is a sectional view as in FIG. 17, but showing another different embodiment of the mixing housing.
Figure 27:
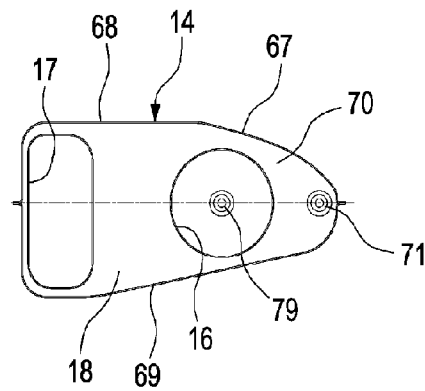
FIG. 27 is an axial view of the mixing housing corresponding to the embodiment according to FIG. 21.
Figure 21:
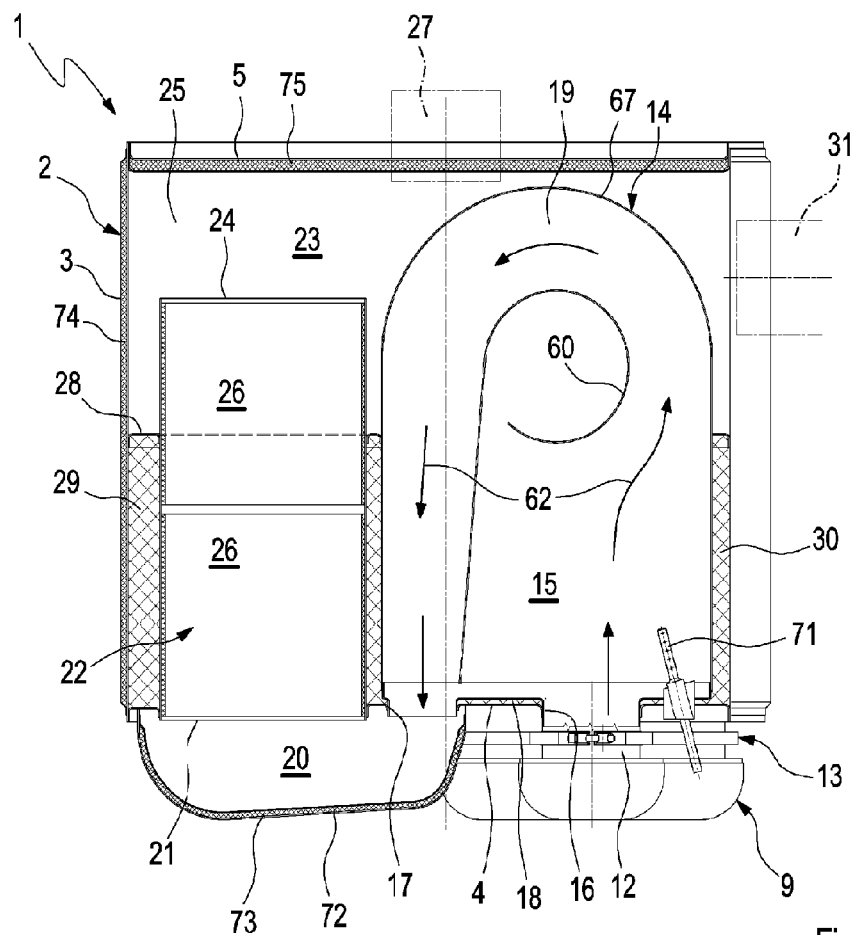
FIG. 21 is a sectional view as in FIG. 17, but showing another different embodiment of the mixing housing.
Figure 28:
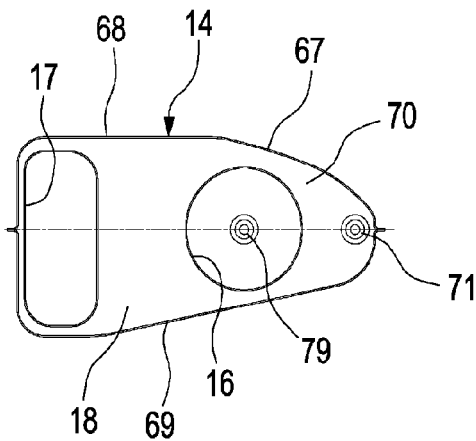
FIG. 28 is an axial view of the mixing housing corresponding to the embodiment according to FIG. 22.
Figure 22:
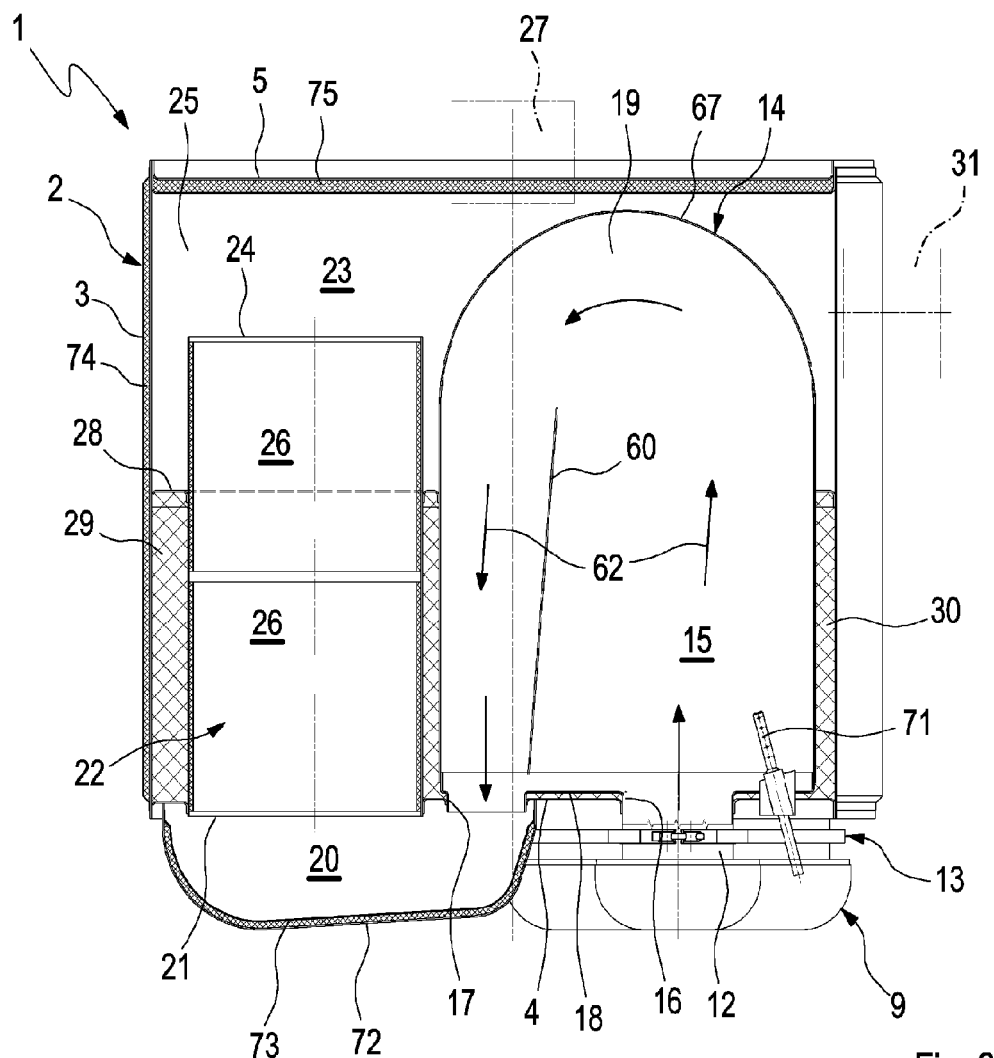
FIG. 22 is a sectional view as in FIG. 17, but showing another different embodiment of the mixing housing.
Figure 29:
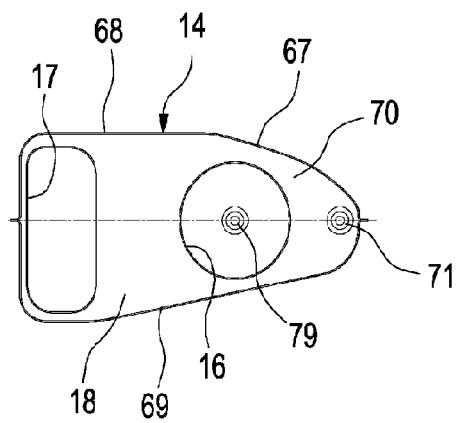
FIG. 29 is an axial view of the mixing housing corresponding to the embodiment according to FIG. 23.
Figure 23:
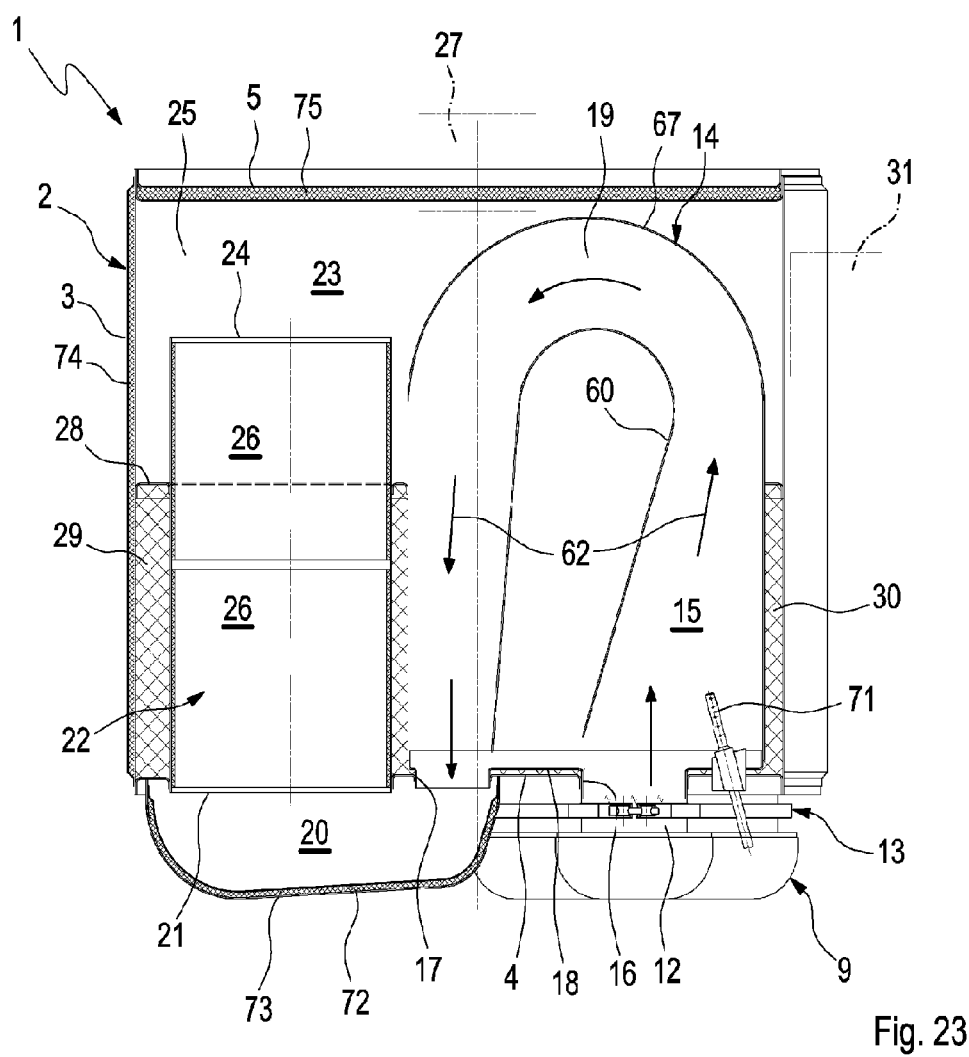
FIG. 23 is a sectional view as in FIG. 17, but showing another different embodiment of the mixing housing.

The configuration shown in FIG. 20, which makes do without an intermediate wall 63, also leads to a flow deflection by about 540°.

The intermediate wall 63 shown in the embodiments according to FIGS. 18 and 19 has at least one passage opening 64, through which the exhaust gas proceeds from one plane to the other plane along the mixing section 62. The mixing housing 14 is preferably designed here such that inlet 16 communicates with one plane while the outlet 17 is communicatingly connected to the other plane. The two guide walls 60, 61 are equipped with a respective connection opening 65 and 66 in the embodiment shown in FIG. 19. The guide walls 60, 61 are arranged in these embodiments within the mixing chamber 15 such that they divide the mixing section 62 into a plurality of sectors. The aforementioned connection openings 65, 66 now make possible a communicating connection of consecutive sectors. The flow guiding can be improved hereby and the mixing section 62 can be extended with simple means. It is clear that the mixing chamber 14 can also make do without a guide wall 60, 61 and without an intermediate wall 63 in a simple embodiment.

The mixing housing 14 is made gas-tight against the interior space 23 of the main housing 2. The main housing 2 can consequently be made of less expensive materials. Furthermore, leakage can be tolerated in the main housing 2, so that the manufacture of the main housing 2 can also be carried out at a lower cost.

In the embodiments being shown here the mixing housing 14 has a housing body 67. Housing body 67 has a front side 18, already mentioned above, which faces the first end bottom 4 of the main housing 2. This front side 18 has the inlet 16 and the outlet 17 of the mixing housing 14. Corresponding to the preferred embodiments being shown here, inlet 16 is designed as an inlet pipe connection, which passes through an inlet opening, not designated more specifically, of the first end bottom 4 of the main housing 2. Said inlet opening may be provided as an example with an outwardly projecting collar extending circumferentially in an annular pattern. Analogously hereto, outlet 17 may be designed as an outlet pipe connection, which passes through an outlet opening, not designated more specifically, of the first end bottom 4 of the main housing 2. This outlet opening may also be provided with an outwardly projecting collar extending circumferentially in an annular pattern. The pipe connections preferably extend in parallel to one another.

The housing body 67 may preferably be designed as a monocoque construction and have an upper shell 68 and a lower shell 69 according to the views in FIGS. 24-29. Furthermore, a front shell 70 forming the front side 18 may be provided as an additional component. The mixing housing 14 can be manufactured and made gas-tight at an especially low cost due to the mode of construction being proposed.

The exhaust gas-treating device 1 shown here is equipped corresponding to FIGS. 17-23 as well as 24-29 with at least one dosing means 71, by means of which a liquid educt, namely, preferably a reducing agent, can be introduced into the mixing chamber 15. For example, ammonia or urea or an aqueous urea solution can be mixed with the exhaust gas flow upstream of the SCR catalytic converter 22. The dosing means 71 is preferably positioned for this such that the reducing agent is introduced quasi at the beginning of the mixing section 62. The dosing means 71 is preferably positioned such that it can introduce the reducing agent into the mixing chamber 15 in the area of the inlet 16 of the mixing housing 14. The dosing means 71 is preferably arranged at the first end bottom 4, namely, such that it passes through this first end bottom 4 as well as the mixing housing 14. The dosing means 71 is positioned in the example such that it passes through the front side 18 or the front shell 70 of the housing body 68.

Figure 30:
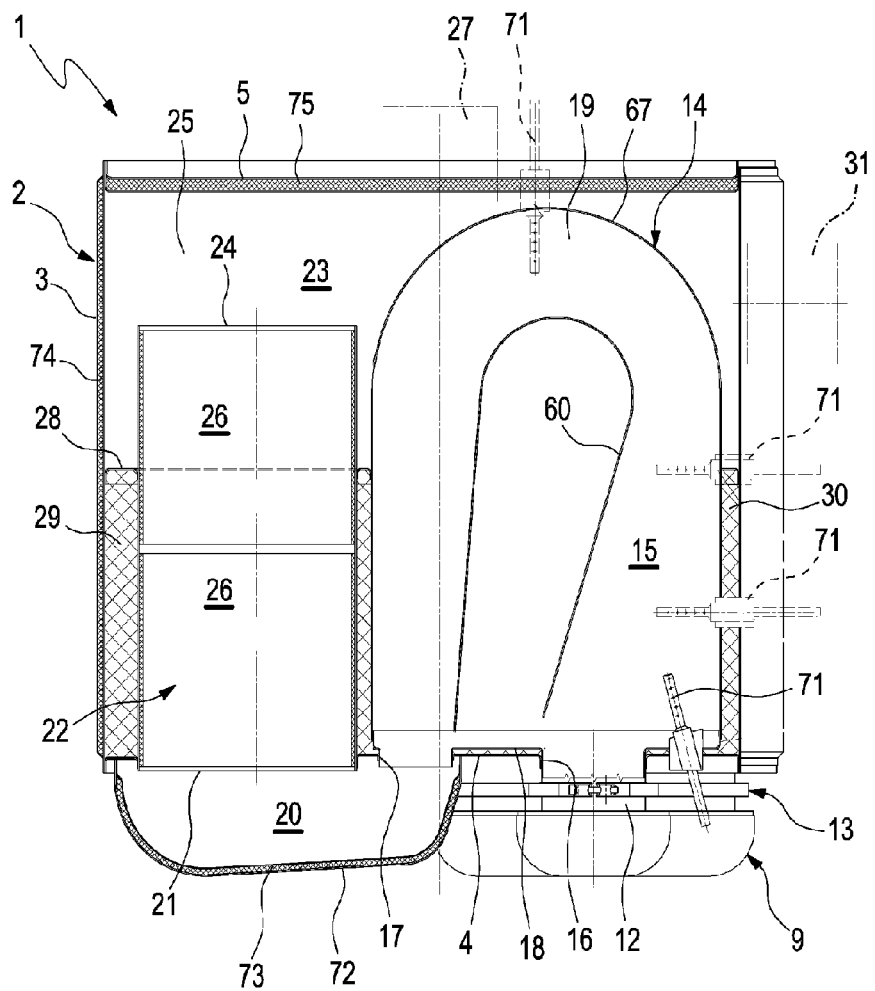
FIG. 30 is another sectional view as in FIGS. 17-23 for illustrating various installation positions of a dosing means.

Basically, the arrangement or positioning of the dosing means 71 in relation to the mixing housing 14 can be selected quasi as desired. FIG. 30 therefore shows as an example additional positions, which are suitable for the arrangement of such a dosing means.

To embody the additional deflecting chamber 20, a deflecting shell 72 may be arranged at the first end bottom 4. Together with an area of the first end bottom 4 covered by the deflecting shell 72, the deflecting shell 72 defines the additional deflecting chamber 20. Corresponding to FIG. 1, this deflecting shell 72 is dimensioned such that it covers the outlet 17 of the mixing housing 14 as well as the respective inlet 21 of the respective SCR catalytic converter 22.

Deflecting shell 72 has a double-walled design in the example, which can be used to embody an air gap insulation. A thermally insulating insulating material 73 may likewise be introduced into the double wall of the deflecting shell 72. Jacket 3 of the main housing 2 may be of a double-walled design. This can be used to embody an air gap insulation or to introduce a thermally insulating insulating material 74. The second end bottom 5 may of a double-walled design for an air gap insulation or for receiving a thermally insulating insulating material 75.

Corresponding to FIG. 3, the deflecting housing 9 comprises a pot-shaped shell body 76 and a cover or bottom 77, between which the deflecting chamber 10 is defined. The cover or bottom 77 has the respective inlet 11 and the respective outlet 12. Shell body 76 is of as double-walled design in the example shown in FIG. 3 and may correspondingly form an air gap insulation or, like here, a mounting space for accommodating a thermally insulating insulating material 78.

Corresponding to FIG. 3 as well as corresponding to FIGS. 24-29, a dosing means 79 or an additional dosing means 79, by means of which a liquid educt, especially a reducing agent, can be likewise introduced into the exhaust gas flow, may be provided as an alternative or in addition to the aforementioned dosing means 71. This additional dosing means is arranged at the deflecting housing 9 here, namely, such that it can introduce the corresponding educt in the direction of the inlet 16 of mixing housing 14. The dosing means 79 belongs in this case to the construction volume of the deflecting housing 9. The path to the inlet 16 or through the inlet 16 to the mixing section 15 or to the mixing section 62 is additionally added in this configuration in order to further extend this.

While specific embodiments of the invention have been described in detail to illustrate the application of the principles of the invention, it will be understood that the invention may be embodied otherwise without departing from such principles.

What is claimed is:

1. An exhaust gas-treating device for an exhaust system of an internal combustion engine, the exhaust gas-treating device comprising:
   a housing with a jacket extending circumferentially on a side of said housing and at least one bottom, said housing defining an interior space;
   a mixing housing arranged in said interior space of said housing, said mixing housing having an inlet, which passes through said at least one bottom and communicates with a mixing chamber of said mixing housing, and said mixing housing having an outlet, which passes through said at least one bottom and communicates with said mixing chamber; and
   at least one guide wall forming a mixing section leading from said inlet via at least one deflecting section to said outlet, said guide wall being arranged in said mixing housing.

2. An exhaust gas-treating device in accordance with claim 1, wherein said mixing chamber is gas-tight against said interior space of said housing, said at least one guide wall comprising an arcuate portion, at least said arcuate portion defining at least a portion of said deflecting section.

3. An exhaust gas-treating device in accordance with claim 1, wherein said mixing housing has a housing body with a front side facing said bottom of said housing, wherein said front side has said inlet and said outlet.

4. An exhaust gas-treating device in accordance with claim 1, wherein:
   said inlet comprises an inlet pipe connection, which passes through an inlet opening of said at least one bottom of said housing;
   said outlet comprises an outlet pipe connection, which passes through an outlet opening of said bottom of said housing.

5. An exhaust gas-treating device in accordance with claim 1, further comprising an intermediate wall separating two planes, in which the mixing section extends, said intermediate wall being arranged in said mixing chamber.

6. An exhaust gas-treating device in accordance with claim 5, wherein said intermediate wall has at least one passage opening, through which an exhaust gas flow enters from one plane to the other plane.

7. An exhaust gas-treating device in accordance with claim 1, wherein said at least one guide wall divides the mixing section into sectors, which are connected to one another communicatingly via at least one connection opening, said connection opening being formed in said at least one guide wall, said at least one guide wall and said deflecting section defining a fluid mixing path, wherein said mixing chamber receives exhaust gas and a reducing agent, said exhaust gas and said reducing agent moving along said fluid mixing path such that said exhaust gas mixes with said reducing agent to form a mixed exhaust gas reducing agent fluid flow, said mixed exhaust gas reducing agent fluid flow exiting said mixing housing via said outlet.

8. An exhaust gas-treating device in accordance with claim 1, wherein an exhaust gas flow led through said mixing housing is deflected by more than 180° and at least by one of 450° and 540° from the inlet to the outlet.

9. An exhaust gas-treating device in accordance with claim 1, further comprising at least one dosing means for introducing a reducing agent into the mixing chamber, at least a portion of said dosing means being arranged in said mixing chamber.

10. An exhaust gas-treating device in accordance with claim 9, wherein the dosing means is arranged at said housing and passes through said bottom and passes through said mixing housing.

11. An exhaust gas-treating device in accordance with claim 9, wherein said dosing means is positioned for introducing a reducing agent into the mixing chamber in an area of said inlet of said mixing chamber.

12. An exhaust gas-treating device in accordance with claim 1, further comprising:
   a deflecting shell defining a deflecting chamber; and
   at least one SCR catalytic converter having an inlet communicatingly connected to said outlet of said mixing housing via said deflecting chamber, said least one SCR catalytic converter being arranged in said housing, one portion of said deflecting shell being arranged adjacent to said outlet of said mixing housing and another portion of said deflecting shell being arranged adjacent to said inlet of said at least one SCR catalytic converter, said deflecting chamber defining at least a portion of a mixed exhaust gas reducing agent flow path, wherein exhaust gas mixed with a reducing agent passes from said outlet to said at least one SCR catalytic converter via at least said mixed exhaust gas reducing agent flow path, said outlet of said mixing housing being adjacent to said inlet of said at least one SCR catalytic converter.

13. An exhaust gas-treating device in accordance with claim 1, further comprising:

a deflecting housing defining a deflecting chamber; and at least one particle filter with an outlet communicatingly connected to said inlet of said mixing housing via said deflecting chamber, said at least one particle filter being arranged in said housing, one portion of said deflecting housing being arranged adjacent to said outlet of said at least one particle filter and another portion of said deflecting housing being arranged adjacent to said inlet of said mixing housing, said deflecting chamber defining at least a portion of an exhaust gas flow path, wherein exhaust gas passes from said outlet of said at least one particle filter to said inlet of said mixing housing via said exhaust gas flow path, wherein said inlet of said mixing housing is located at a position above said outlet of said at least one particle filter.

14. An exhaust gas-treating device in accordance with claim 13, wherein said deflecting chamber connects said outlet of said at least one particle filter to said inlet of said mixing housing, said deflecting chamber being arranged in said deflecting housing with a deflecting housing inlet detachably connected to said outlet of said at least one particle filter via a fastening means and whose outlet is detachably connected to the inlet of said mixing housing via an identical or another fastening means.

15. An exhaust gas-treating device in accordance with claim 14, wherein said outlet of said at least one particle filter is formed by an outlet end of a mounting tube, into which the particle filter is plugged axially.

16. An exhaust gas-treating device for an exhaust system of an internal combustion engine of a motor vehicle, the exhaust gas-treating device comprising:

a housing with a jacket extending circumferentially on a side of said housing and at least one bottom, said housing defining an interior space;

a mixing housing arranged in said interior space of said housing, said mixing housing having an inlet, which passes through said bottom and communicates with a mixing chamber of said mixing housing, and said mixing housing having an outlet, which passes through said bottom and communicates with said mixing chamber, said inlet comprising an inlet pipe connection, which passes through an inlet opening of said at least one bottom of said housing and said outlet comprising an outlet pipe connection, which passes through an outlet opening of said bottom of said housing, said mixing housing comprising an inner mixing housing surface;

a guide wall comprising a guide wall arcuate portion, said guide wall extending from said inlet via at least said guide wall arcuate portion to said outlet, said guide wall being arranged in said mixing housing, at least said guide wall arcuate portion and a portion of said inner mixing housing surface defining a mixing section of said mixing housing for mixing a reducing agent with exhaust gas.

17. An exhaust gas-treating device in accordance with claim 16, wherein said mixing chamber is gas-tightly sealed with respect to said interior space of said housing, at least one portion of said guide wall extending in a direction away from said inlet, at least another portion of said guide wall extending in a direction of said outlet, said direction away from said inlet being opposite said direction of said outlet, said portion of said inner mixing housing surface comprising an arcuate inner mixing housing surface portion.

18. An exhaust gas-treating device in accordance with claim 17, wherein said mixing housing has a housing body with a front side facing said bottom of said housing, wherein said front side has said inlet and said outlet.

19. An exhaust gas-treating device in accordance with claim 16, further comprising:

an intermediate wall separating two planes, in which the mixing section extends, said intermediate wall being arranged in said mixing chamber, wherein said intermediate wall has at least one passage opening, through which an exhaust gas flow enters from one plane to the other plane and said guide wall divides the mixing section into sectors, which are connected to one another communicatingly via at least one connection opening, said connection opening being formed in said guide wall.

20. An exhaust gas-treating device in accordance with claim 16, further comprising at least one dosing means for introducing the reducing agent into the mixing chamber, at least a portion of said dosing means being arranged in said mixing chamber, wherein said exhaust gas mixes with said reducing agent via at least said guide wall to form a mixed exhaust gas reducing agent gas mixture.

* * * * *